(12) United States Patent
Ajima

(10) Patent No.: US 7,633,973 B2
(45) Date of Patent: Dec. 15, 2009

(54) PACKET PROCESSING DEVICE, AND RECORDING MEDIUM RECORDING A PACKET PROCESSING PROGRAM

(75) Inventor: Yuichiro Ajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 11/348,267

(22) Filed: Feb. 7, 2006

(65) Prior Publication Data

US 2007/0025396 A1  Feb. 1, 2007

(30) Foreign Application Priority Data

Jul. 29, 2005 (JP) ............................. 2005-219778

(51) Int. Cl.
*H04J 3/24* (2006.01)
(52) U.S. Cl. ..................................................... 370/474
(58) Field of Classification Search ................. 370/229, 370/235, 230, 232, 464, 474; 709/230, 232, 709/233
See application file for complete search history.

(56) References Cited

U.S. PATENT DOCUMENTS

| | | | | |
|---|---|---|---|---|
| 4,677,612 A | * | 6/1987 | Olson et al. | 370/445 |
| 5,566,163 A | * | 10/1996 | Petit | 370/230 |
| 6,483,804 B1 | * | 11/2002 | Muller et al. | 370/230 |
| 6,563,796 B1 | * | 5/2003 | Saito | 370/252 |
| 6,683,889 B1 | * | 1/2004 | Shaffer et al. | 370/516 |
| 6,714,985 B1 | * | 3/2004 | Malagrino et al. | 709/236 |
| 6,715,005 B1 | * | 3/2004 | Rodriguez et al. | 710/41 |
| 2001/0003526 A1 | * | 6/2001 | Kanehara | 370/465 |
| 2006/0133365 A1 | * | 6/2006 | Manjunatha et al. | 370/389 |

OTHER PUBLICATIONS

Patent Abstracts of Japan, Publication No. 2000-332817, Published Nov. 11, 2000.
Cover page of WO 00/52879 dated Sep. 8, 2000.
Patent Abstracts of Japan, Publication No. 2000-332817, Published Nov. 30, 2000.

* cited by examiner

*Primary Examiner*—Kwang B Yao
*Assistant Examiner*—Obaidul Huq
(74) *Attorney, Agent, or Firm*—Fujitsu Patent Center

(57) ABSTRACT

A packet processing device for effectively assembling packets. A packet accumulator stores received packets. A packet analyzer extracts, from the packets, analysis information about flows to which the packets belong. A frequency predictor calculates a frequency prediction value based on the reception interval of packets belonging to an identical flow, and stores the calculated value in a frequency prediction storage. Also, in response to input of the analysis information, the frequency predictor reads the corresponding frequency prediction value and sends the read value to a flow processor. The flow processor generates flow information on the flow corresponding to the analysis information, and analyzes the generated flow information and those stored in a flow information storage, to select an assembling termination flow based on the frequency prediction values. A packet transfer unit reads the packets corresponding to the selected flow from the packet accumulator and transfers the packets to a host.

13 Claims, 15 Drawing Sheets

|  | ELAPSED TIME | LEVEL VALUE |
|---|---|---|
| SHORT-INTERVAL TIMER | 0 | 111 |
|  | 1 | 110 |
|  | 2 | 101 |
|  | 3 | 100 |
| LONG-INTERVAL TIMER | 10 | 011 |
|  | 20 | 010 |
|  | 30 | 001 |
|  | 40 | 000 |

FIG. 4

| SOURCE IP ADDRESS | SOURCE PORT NO. | DESTINATION PORT NO. | NEXT SEQUENCE NO. | TIMER/COUNTER | .... | FREQUENCY PREDICTION VALUE |
|---|---|---|---|---|---|---|
| 210.123.45.67 | 33333 | 80 | 789456123 | 34 | | 110 |
| 210.123.45.89 | 44556 | 80 | 3456 | 56 | | 100 |
| 200.100.10.10 | 54321 | 80 | 9753124680 | 251 | | 010 |
| 210.123.45.67 | 33445 | 20 | 369257148 | 15 | | 111 |
| .... | .... | .... | .... | .... | | .... |

| FLOW ID INFO (310) | ASSEMBLING MANAGEMENT INFO (320) — 322 |

FIG. 10

| SOURCE IP ADDRESS | SOURCE PORT NO. | DESTINATION PORT NO. | NEXT SEQUENCE NO. | TIMER/ COUNTER |
|---|---|---|---|---|
| 210.123.45.67 | 33333 | 80 | 7894561234 | 34 |
| 210.123.45.89 | 44556 | 80 | 3456 | 56 |
| 200.100.10.10 | 54321 | 80 | 9753124680 | 251 |
| 210.123.45.67 | 33445 | 20 | 369257148 | 15 |

301, 302, 303, 304

| FREQUENCY PREDICTION VALUE |
|---|
| 110 |
| 100 |
| 010 |
| 111 |

FIG. 12

| SOURCE IP ADDRESS | SOURCE PORT NO. | DESTINATION PORT NO. | NEXT SEQUENCE NO. | TIMER/ COUNTER | FREQUENCY PREDICTION VALUE |
|---|---|---|---|---|---|
| 210.123.45.67 | 33333 | 80 | 789456123 | 34 | 110 |
| 210.123.45.89 | 44556 | 80 | 3456 | 56 | 100 |
| 210.123.45.89 | 44668 | 20 | 876653465 | 0 | 101 |
| 210.123.45.67 | 33445 | 20 | 369257148 | 15 | 111 |

PACKET PROCESSING DEVICE, AND RECORDING MEDIUM RECORDING A PACKET PROCESSING PROGRAM

CROSS-REFERENCE TO RELATED APPLICATIONS

This application is based on, and claims priority to, Japanese Patent Application No. 2005-219778, filed Jul. 29, 2005, which is incorporated herein by reference.

BACKGROUND OF THE INVENTION

1. Field of the Invention

The present invention relates to packet processing devices and recording media recording a packet processing program, and more particularly, to a packet processing device for receiving a plurality of flows of packets arriving in random order and assembling the packets according to the flows, and a recording medium recording a packet processing program for performing such process.

2. Description of the Related Art

The performance of computers as well as the transmission rates of computer networks have been exponentially improving with the years, while restrictions remain placed on packet sizes in order to maintain compatibility of communication schemes. Interfaces connecting computers and networks are therefore required to handle packets of small sizes, compared to the transmission rate, thus constituting a bottleneck in the communication performance.

In TCP (Transmission Control Protocol)/IP (Internet Protocol) communications over Ethernet (registered trademark), for example, a maximum packet size is normally set at about 1500 bytes. Thus, a 10-gigabit Ethernet network operating at full capacity demands that computers transmit/receive approximately 830,000 packets/second, even though the packet size is at a maximum (about 1500 bytes). Consequently, protocol processes of segmenting data into packets for transmission and acquiring data from received packets constitute an extremely heavy load on the processors of computers.

The situation can be improved by enlarging the packet size. However, enlargement of the packet size requires that computer network devices such as switches should be able to handle such large-sized packets, and thus cannot be applied to existing networks. Conventionally, therefore, a network interface circuit is so configured as to perform the function of segmenting data into a plurality of small-sized packets for transmission, to thereby mitigate the load on the processor of a transmitting-side computer.

The receiving side, on the other hand, receives a large number of flows of packets randomly transmitted from various sources, and since some packets are delayed or lost, the received packets cannot be mechanically processed, unlike at the transmitting side. Accordingly, a packet processing device is provided between a network and a receiving-side computer to assemble received packets into larger-sized packets. FIG. 15 shows the configuration of a conventional packet processing device.

A packet received via a network is sent to a packet queue 901 and a packet parser 902. The packet queue 901 is a buffer for storing packets. The packet parser 902 accumulates flow information (INFO) in a flow table (storage device) 903. The flow information is a combination of packet analysis information, which includes identification information such as IP addresses and port numbers extracted from the header of the packet and position information indicating the packet position on the flow, and management information such as a timer/counter for measuring time up to the arrival of a succeeding packet. A flow processor 904 looks up the flow information stored in the flow table 903 to determine a flow to be assembled, and sends the corresponding flow information to a DMA (Direct Memory Access) engine 905. In accordance with the flow information, the DMA engine 905 assembles the target packets stored in the packet queue 901 and transfers the packets to the memory of a host.

There has also been proposed a packet processing device in which, in accordance with an available buffer size of the higher-layer protocol, lower-layer packets are reassembled into a single big packet (e.g., Unexamined Japanese Patent Publication No. 2000-332817 (cf. paragraph nos. [0067] to [0084], FIG. 4)).

However, the conventional packet processing devices are associated with the problem that it is difficult to effectively assemble packets especially during communication of a large number of flows.

The conventional packet assembling process is managed by the flow table, and in order for received packets to be effectively assembled during communication of numerous flows, the flow table needs to hold a sufficiently large number of entries. Also, in some flow tables, forwarding addresses are linked in a direct manner or by a protocol such as an RDMA protocol, and the number of entries of the flow table restricts the number of flows to be communicated. However, in cases where the host is a server or the like, the number of receive flows is as large as several thousands to several tens of thousands, and from the point of view of hardware capabilities, it is difficult to permit the entry of all flows and to assemble all flows in parallel. Excessively increasing the number of entries of the flow table, on the other hand, entails waste of memory capacity and thus is not desirable.

Further, in order to assemble packets into a big packet, the transfer of packets to the host needs to be delayed to wait for the arrival of succeeding packets. Accordingly, in cases where the packet assembling range is not specified by a protocol like TCP, the assembling process is terminated mostly due to the time-out of a succeeding packet wait state. As a result, packets are not transferred to the host until the assembling process is terminated, giving rise to the problem that the arrival of packets at the host is delayed.

SUMMARY OF THE INVENTION

The present invention was created in view of the above circumstances, and an object thereof is to provide a packet processing device and a computer-readable recording medium recording a packet processing program whereby packets can be effectively assembled.

To achieve the object, there is provided a packet processing device for receiving a plurality of flows of packets arriving in random order and assembling the packets according to the flows. The packet processing device comprises a packet accumulator for storing the received packets, a packet analyzer for analyzing the received packets and extracting analysis information about the flows to which the respective packets belong, a frequency predictor for measuring a reception interval of packets belonging to an identical one of the flows, calculating a reception frequency prediction value based on the measured reception interval, and storing the calculated frequency prediction value in a frequency prediction storage, the frequency predictor being operative in response to input of the analysis information to read, from the frequency prediction storage, the frequency prediction value of the flow corresponding to the input analysis information, a flow processor for generating flow information including the read frequency prediction value of the flow corresponding to the analysis information, selecting an assembling termination flow indicative of a flow of which packet assembling is to be terminated, based on the frequency prediction value of the generated flow information as well as those set in flow information stored in a flow information storage, and updating the flow information stored in the flow information storage, and a packet transfer unit, responsive to selection of the assembling termination flow by the flow processor, for outputting the packets stored in the packet accumulator and associated with the selected assembling termination flow to a transfer destination.

Also, to achieve the above object, there is provided a computer-readable recording medium recording a packet processing program for receiving a plurality of flows of packets arriving in random order and assembling the packets according to the flows. The packet processing program recorded on the recording medium causes a computer to function as a packet analyzer for analyzing the received packets and extracting analysis information about the flows to which the respective packets belong, a frequency predictor for measuring a reception interval of packets belonging to an identical one of the flows, calculating a reception frequency prediction value based on the measured reception interval, and storing the calculated frequency prediction value in a frequency prediction storage, the frequency predictor being operative in response to input of the analysis information to read, from the frequency prediction storage, the frequency prediction value of the flow corresponding to the input analysis information, a flow processor for generating flow information including the read frequency prediction value of the flow corresponding to the analysis information, selecting an assembling termination flow indicative of a flow of which packet assembling is to be terminated, based on the frequency prediction value of the generated flow information as well as those set in flow information stored in a flow information storage, and updating the flow information stored in the flow information storage, and a packet transfer unit, responsive to selection of the assembling termination flow by the flow processor, for outputting the packets stored in a packet accumulator and associated with the selected assembling termination flow to a transfer destination.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 exemplifies frequency prediction values used in the embodiment.

FIG. 10 shows an exemplary flow table used in the embodiment.

FIG. 12 shows an exemplary state of the flow table before replacement of entries during the assembling process according to the embodiment.

FIG. 14 shows an exemplary state of the flow table after replacement of entries during the assembling process according to the embodiment.

DESCRIPTION OF THE PREFERRED EMBODIMENTS

Preferred embodiments of the present invention will be described below with reference to the accompanying drawings. In the following, first, the concept of the invention applied to embodiments will be described, and then specific embodiments will be explained in detail.

Figure 1:
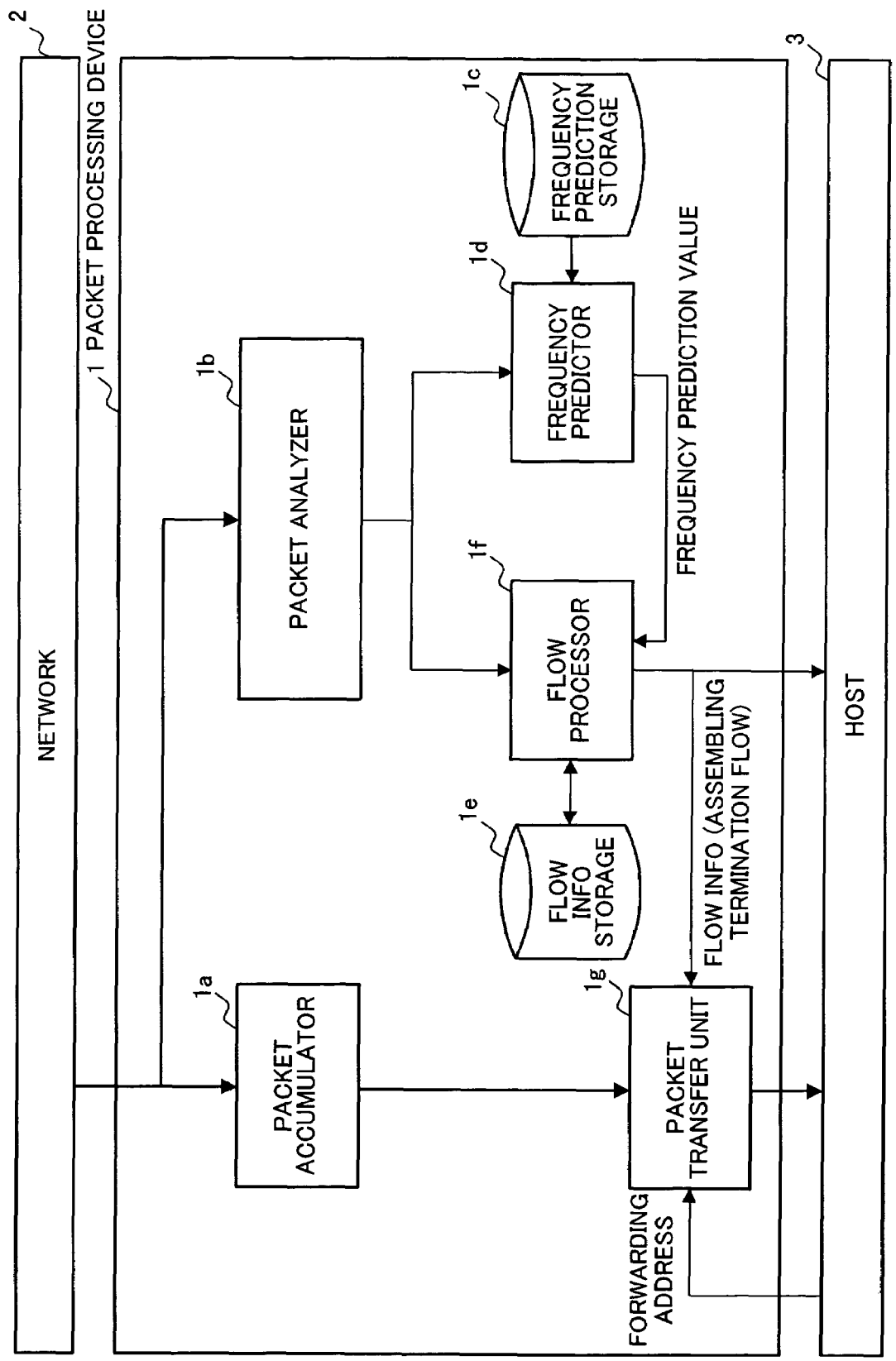
FIG. 1 is a conceptual diagram illustrating the invention applied to embodiments.

FIG. 1 is a conceptual diagram illustrating the invention applied to the embodiments.

A packet processing device 1 is connected between a network 2 and a host computer (hereinafter referred to as host) 3 and assembles packets received from the network 2 to be transferred to the host 3. The packet processing device 1 comprises a packet accumulator 1a, a packet analyzer 1b, a frequency prediction storage 1c, a frequency predictor 1d, a flow information storage 1e, a flow processor 1f, and a packet transfer unit 1g. Other devices connected to the network 2 segment data into packets and successively transmit the packets to the host 3. Consequently, the packet processing device 1 is input, in random order, with packets belonging to numerous flows. In the following, the term "flow" denotes a group of related packets transmitted from a transmitting-side network interface circuit which obtains the packets by segmenting data of a given size.

The packet accumulator 1a is a buffer which stores packets received by the packet processing device 1 until an instruction is received from the packet transfer unit 1g.

The packet analyzer 1b acquires each receive packet input to the packet accumulator 1a and analyzes the packet to extract analysis information about the flow to which the packet belongs. If the protocol used is TCP/IP, for example, the flow to which a packet belongs can be identified by the source and destination IP addresses, source and destination port numbers, etc. The packet analyzer 1b extracts such items of information included in the received packet and sends the extracted information to the frequency predictor 1d and the flow processor 1f as the analysis information.

The frequency prediction storage 1c stores frequency prediction values calculated by the frequency predictor 1d with respect to individual flows.

The frequency predictor 1d measures the reception interval of packets belonging to each flow, calculates a reception frequency prediction value based on the measured reception interval, and stores the calculated frequency prediction value in the frequency prediction storage 1c. The reception interval is measured in the manner described below, for example. A timer/counter is initialized when a packet belonging to a certain flow is received, the value of the timer/counter is updated with every passage of a predetermined time, and when a succeeding packet is received, the reception interval is measured based on the then-assumed value of the timer/counter. The reception interval may alternatively be measured by obtaining a time difference between the previously stored reception time and the time of reception of a succeeding packet. Based on the measured reception interval, a frequency prediction value evaluating the reception interval is set. A "large frequency prediction value" indicates a state in which the reception count per given time is high, that is, packets of the corresponding flow are received at short intervals of time. A "small frequency prediction value" indicates a state in which the reception interval is long. The frequency prediction value obtained in this manner is stored in an area of the frequency prediction storage 1c assigned to the corresponding flow and specifying the flow by means of the analysis information. In the case where the protocol used is TCP/IP, for example, an enormous number of combinations each including source and destination IP addresses and source and destination port numbers need to be stored, and it is not practical to provide the frequency prediction storage 1c with an area capable of storing all such combinations. Accordingly, information such as source and destination IP addresses and source and destination port numbers is compressed to a hash value of predetermined length by using a hash function, for example, so that the frequency prediction value may be stored in an area of the frequency prediction storage 1c corresponding to the hash value. When the analysis information is input, that is, when a packet is received by the packet processing device 1, the frequency prediction value corresponding to the flow of the received packet is read out on the basis of the analysis information and is output to the flow processor 1f.

The flow information storage 1e stores flow information about the received packets assembled according to flows.

The flow processor 1f acquires the analysis information on the received packet from the packet analyzer 1b as well as the corresponding frequency prediction value from the frequency predictor 1d, then identifies the flow based on the analysis information, and generates flow information about the identified flow. The flow information contains at least the analysis information, timer information indicative of a succeeding packet waiting time, and the frequency prediction value. The flow processor then selects an assembling termination flow indicative of a flow of which the packet assembling is to be terminated, based on the frequency prediction value included in the generated flow information as well as those included in the flow information stored in the flow information storage 1e, and updates the flow information stored in the flow information storage 1e. For example, if the flow corresponding to the generated flow information already has an entry in the flow information storage 1e, the frequency prediction value recorded in the entry is updated to a new value. In the case where the flow has no entry, the flow information storage 1e is checked for available space, and if there is a space area and at the same time the frequency prediction value is greater than a reference value, the generated new flow information is stored in the space area. If there is no space area, the frequency prediction values are compared with one another, the flow with the smallest frequency prediction value is selected as the assembling termination flow, the corresponding flow information is deleted from the flow information storage to make a space area, and the new flow information is stored in the space area. In the case where the flow corresponding to the new flow information is selected, the contents of the flow information storage 1e are left unchanged. Also, if the flow has no entry in the flow information storage 1e and has a frequency prediction value smaller than those of the other flow information, or if the received packet is the target of packet assembling, the new flow information is not registered but is sent directly to the packet transfer unit 1g. Further, also when a predetermined waiting time (assembling termination waiting time) set in the flow information as timer information has expired, the corresponding flow is selected as the assembling termination flow.

After the assembling termination flow is selected, the flow information associated with the selected flow is output to the packet transfer unit 1g. At this time, the flow information or a notification of assembling termination is sent to the host 3.

Based on the flow information, the packet transfer unit 1g transfers the corresponding packets stored in the packet accumulator 1a to the host 3. In this case, the packets are transferred to a forwarding address which is specified by the flow information from the flow processor 1f or is instructed from the host 3 in reply to the assembling termination notification.

The packet processing device 1 constructed as described above receives, via the network 2, multiple flows of packets in random order which have been segmented by and transmitted from a plurality of transmitting-side devices. Each received packet is stored in the packet accumulator 1a and is also analyzed by the packet analyzer 1b to extract analysis information identifying the flow to which the received packet belongs. Based on the analysis information, the frequency predictor 1d reads, from the frequency prediction storage 1c, the frequency prediction value calculated with respect to the corresponding flow, sends the read frequency prediction value to the flow processor 1f, and initializes the frequency prediction value. The frequency prediction value is updated appropriately in accordance with the elapsed time until a succeeding packet is received.

The flow processor 1f identifies the flow to which the packet belongs, in accordance with the analysis information, and generates corresponding flow information including the frequency prediction value. Then, the flow processor analyzes the frequency prediction value included in the generated flow information as well as those included in the flow information stored in the flow information storage 1e, to select the assembling termination flow indicative of a flow of which the packet assembling is to be terminated, and sends the corresponding flow information to the packet transfer unit 1g. Subsequently, the flow processor updates the flow information stored in the flow information storage 1e. Also, the flow processor sets, in the flow information, timer information indicative of the assembling termination waiting time, and monitors the waiting time. If the waiting time associated with a certain flow expires, the flow is selected as the assembling termination flow and the corresponding flow information is sent to the packet transfer unit 1g. The packet transfer unit 1g receives the flow information on the assembling termination flow, extracts the corresponding packets from the packet accumulator 1a in accordance with the flow information, and transfers the packets to the host 3.

In this manner, the timing for terminating the packet assembling, namely, the timing for transferring packets to the host 3, is determined not only by the expiry of the assembling termination waiting time but also by the frequency prediction value obtained based on the packet reception interval of the corresponding flow, and it is therefore possible to preferentially process flows of packets for which the packet assembling can be effectively performed. For example, after the number of flows reaches a limit of parallel processing, flows with large frequency prediction values, that is, flows of which the succeeding packets are expected to arrive without delay, are processed preferentially over flows which have small frequency prediction values and thus of which the succeeding packet waiting time is long, whereby the packet assembling can be effectively carried out. It is also possible to shorten the delay time attributable to the packet assembling.

An embodiment of the present invention will be now described in detail with reference to the drawings, wherein the invention is applied, by way of example, to a packet processing device for processing packets communicated according to TCP/IP.

Figure 2:
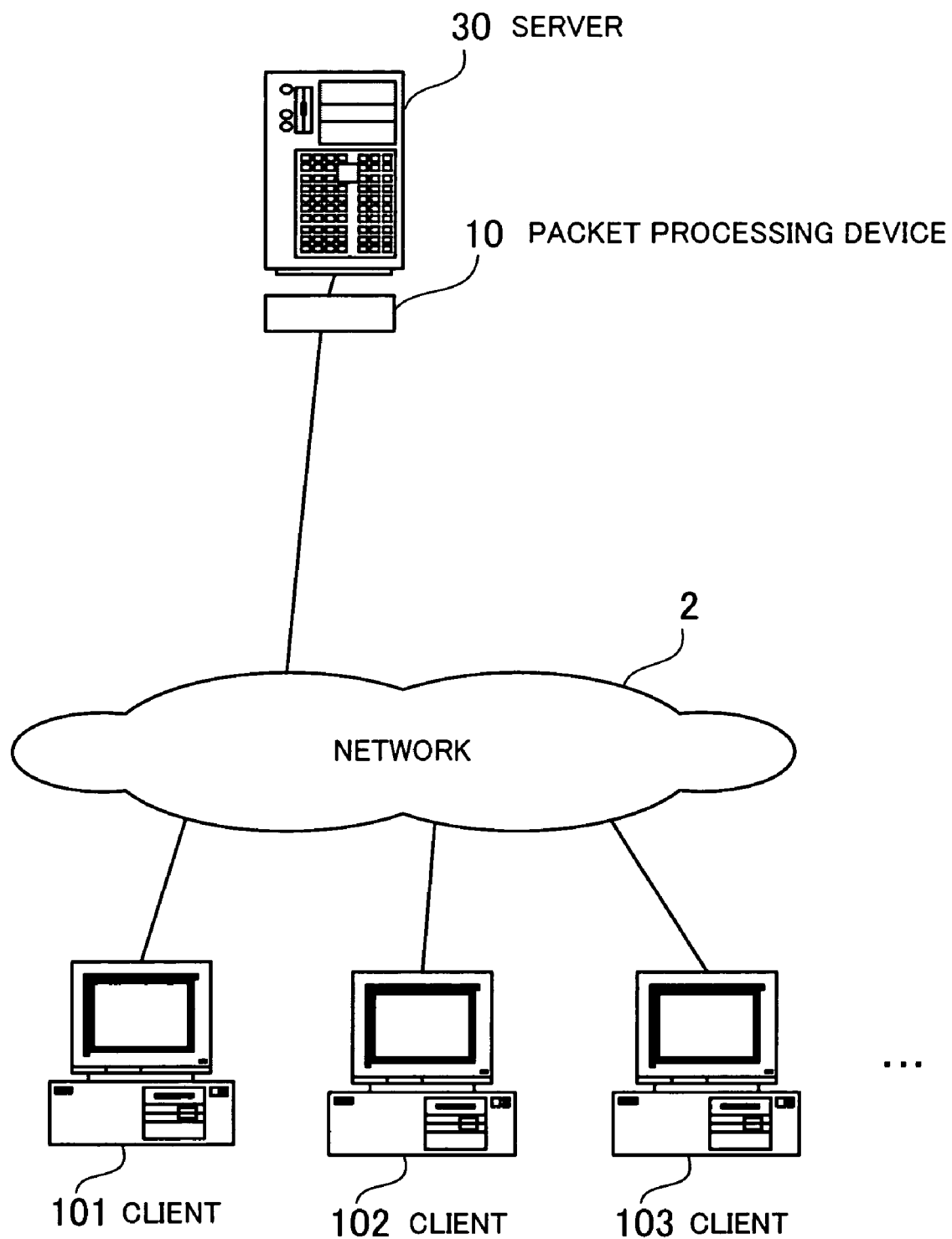
FIG. 2 shows a system configuration according to an embodiment of the present invention.

FIG. 2 illustrates a system configuration according to the embodiment. In the example shown in FIG. 2, a large number of unspecified clients 101, 102, 103, . . . are connected to a server 30 via a network 2, and a packet processing device 10 is arranged between the network 2 and the server 30.

The server 30 provides services at the request of the clients 101, 102, 103, . . . . The clients 101, 102, 103, . . . transmit packets of respective flows at irregular intervals according to TCP/IP. In TCP, no packet assembling range (last packet) is specified and also the total number of transmit packets is indefinite. The packet processing device 10 is capable of analyzing multiple flows of packets arriving at random, efficiently assembling the received packets through the prediction of reception frequencies, and transferring reassembled packets of larger size to the server 30.

When actually applied to a system, the packet processing device 10 is incorporated in a receive interface module (hardware) of the server 30, in order to enable high-speed processing. The processing function of the device 10 may be implemented as a hardware logic incorporated in the interface module. Alternatively, a program describing the processing procedure may be stored in ROM (Read Only Memory) as firmware so that the program may be read from the ROM and executed by the CPU (Central Processing Unit) of the interface module. Also, part of the procedure may be constituted by a program.

Figure 3:
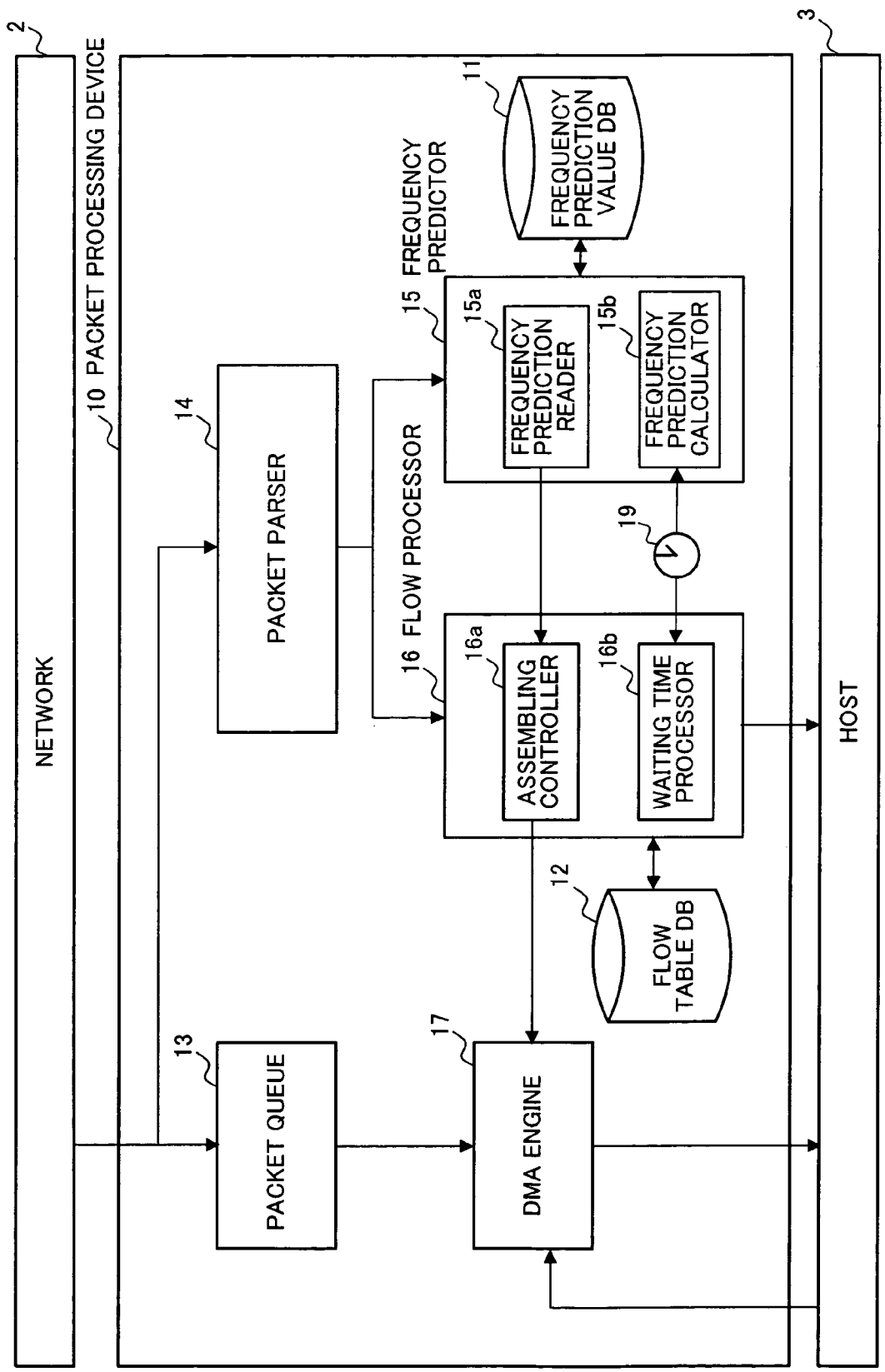
FIG. 3 is a block diagram of a packet processing device according to the embodiment.

FIG. 3 is a block diagram of the packet processing device according to the embodiment. In the figure, like reference numerals denote like elements appearing in FIG. 2, and description of such elements is omitted.

The packet processing device 10 of the embodiment comprises a storage for storing a frequency prediction value database (DB) 11 and a flow table database 12, a packet queue 13, a packet parser 14, a frequency predictor 15, a flow processor 16, and a DMA engine 17.

The frequency prediction value database 11 corresponds to the frequency prediction storage 1c and stores the frequency prediction values of individual flows. The flow table database 12 corresponds to the flow information storage 1e and stores a flow table used for assembling packets of the respective flows. The information stored in these databases will be described in detail later.

The packet queue 13 corresponds to the packet accumulator 1a and temporarily stores packets received from the clients 101, 102, 103, . . . .

The packet parser 14 corresponds to the packet analyzer 1b and extracts, as the analysis information, the source IP address, the source port number, the destination port number and the next sequence number from each of the received TCP/IP packets. When necessary, information such as the code bit of a TCP packet may be additionally extracted. The code bit includes control information, such as URG (Urgent flag) indicating whether to urgently process the included data and PSH (Push flag) specifying whether the data needs to be transferred to a higher-layer application without delay.

The frequency predictor 15, which corresponds to the frequency predictor 1d, includes a frequency prediction reader 15a and a frequency prediction calculator 15b. When input with the analysis information on a received packet from the packet parser 14, the frequency prediction reader 15a calculates an address of the frequency prediction value database 11 where the frequency prediction value of the flow corresponding to the input analysis information is stored. Then, the frequency prediction reader reads the frequency prediction value from an area specified by the calculated address, sends the read value to the flow processor 16, and initializes the frequency prediction value. The frequency prediction calculator 15b is started at regular intervals by a timer 19 or the like, and each time the calculator 15b is started, it updates the frequency prediction values of the individual flows stored in the frequency prediction value database 11.

The frequency prediction value will be explained. The frequency prediction value is calculated on the basis of the time elapsed from the reception of a packet to the reception of the succeeding packet. For example, a plurality of level values corresponding to a plurality of ranges of elapsed time are determined in advance, and as time elapses, the frequency prediction calculator 15b updates the frequency prediction value successively to a lower-level value, thereby setting the frequency prediction value. FIG. 4 exemplifies the frequency prediction values used in the embodiment.

In the example of FIG. 4, the elapsed time is indicated by the count of a timer which is incremented at regular intervals (e.g., at intervals of 10 microseconds) after the reception of a packet, and the level values indicate frequency prediction values set for the respective ranges of the elapsed time. In the illustrated example, each frequency prediction value is indicated by a three-bit value, wherein "111" is highest in level and is set immediately after the reception of a packet, and "000" is lowest in level and is set after a lapse of the time equivalent to the count "40". The value "000" may be used in a different way to indicate packets that are not to be assembled.

Also, in the illustrated example, two types of counters, that is, short-interval timers and long-interval timers, are used to cope with various transmission conditions of flows. With a counter matching a flow with a short reception interval, for example, it is difficult to set a proper frequency prediction value for a flow with a long reception interval. The reverse is also true. Accordingly, for the range from "111" to "101", a short-interval timer is used to update the frequency prediction value at short intervals (e.g., at intervals of 10 microseconds), and for the range from "100" to "000", a long-interval timer is used to update the frequency prediction value at long intervals (e.g., at intervals of 100 microseconds). By using the two types of timers, it is possible to cope with both short and long reception intervals. Reception interval differences may alternatively be coped with by increasing the number of bits of the frequency prediction value (by increasing the number of level values).

Figure 5:
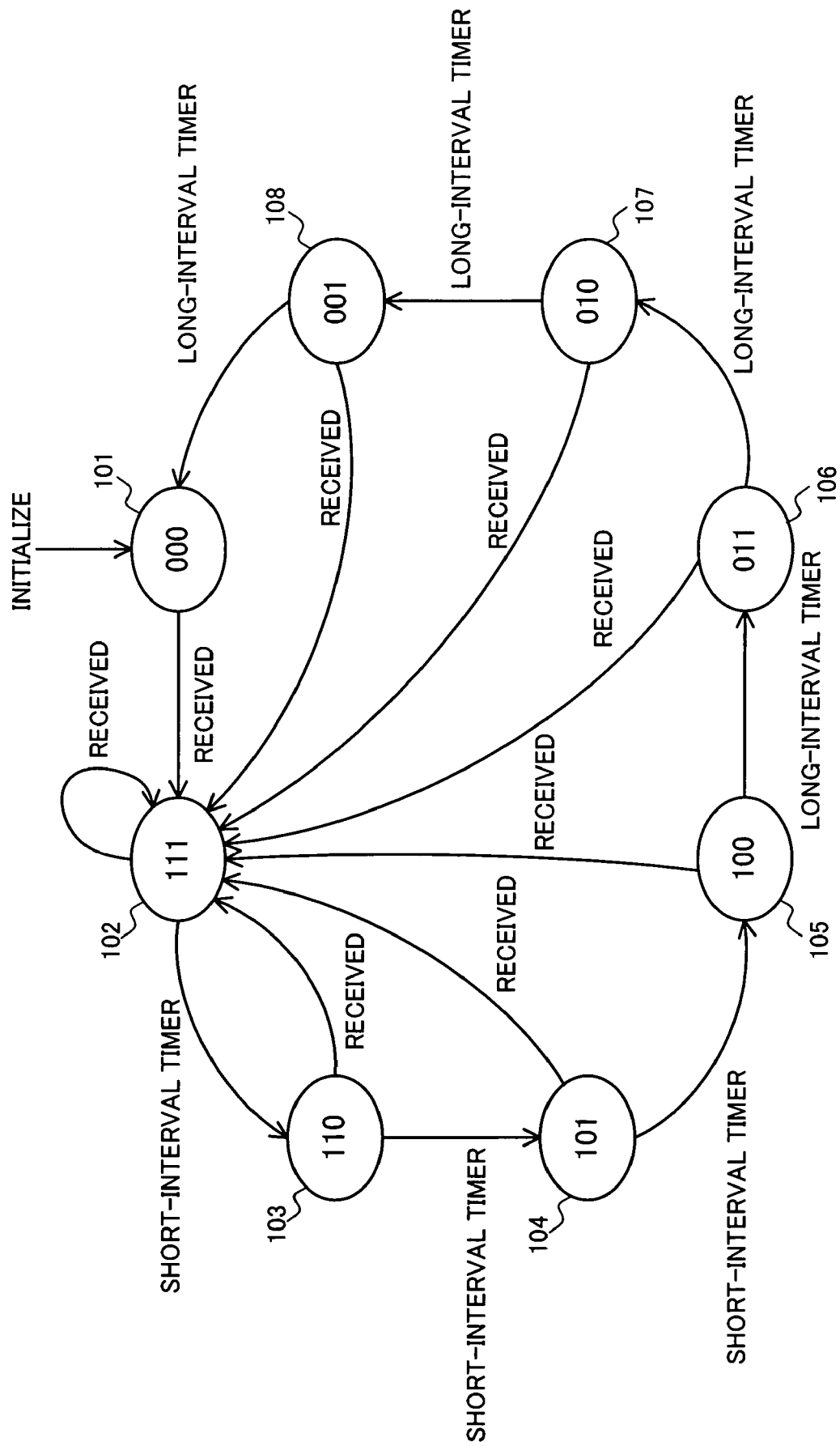
FIG. 5 illustrates the manner of how a frequency prediction value, shown in FIG. 4, is updated.

The frequency prediction value is operated by the frequency prediction reader 15a and the frequency prediction calculator 15b. FIG. 5 illustrates the manner of how the frequency prediction value, shown in FIG. 4, is updated.

In an initialized state, "000" (101) is set as the frequency prediction value. This state lasts until a packet is received.

When a packet is received, the frequency prediction reader 15a reads the then-set frequency prediction value and sets the highest level "111" (102) for the frequency prediction value. The frequency prediction calculator 15b thereafter updates the frequency prediction value with the passage of time until a succeeding packet is received. The short-interval timer operates first, and when the count reaches "1", "1" is subtracted from the frequency prediction value, thereby updating the frequency prediction value to "110" (103). The value remains the same up to a subsequent state (count=2) unless a succeeding packet is received. If a packet is received, the value is reset to "111" (102).

If no packet is received, the frequency prediction value is updated to "111" (104) and then to "100" (105) as the short-interval timer keeps counting. When "100" (105) is reached, the long-interval timer starts to operate and the value is retained until the count reaches "10".

If no packet is received thereafter, the frequency prediction value is updated to "011" (106), "010" (107), "001" (108), and "000" (101) in this order as the long-interval timer keeps counting.

Referring again to FIG. 3, the flow processor 16, which corresponds to the flow processor 1f, includes an assembling controller 16a and a waiting time processor 16b. The assembling controller 16a acquires the analysis information on a received packet from the packet parser 14 as well as the frequency prediction value corresponding to the received packet from the frequency predictor 15. Then, the assembling controller identifies the flow to which the packet belongs, based on the analysis information to generate flow information, and selects the assembling termination flow from among the generated flow information and the flow information stored in the flow table database 12. If the flow already has an entry in the flow table, the frequency prediction value recorded in the entry is updated to a new value. Where the flow has no entry in the flow table, a new entry is added to the flow table if the table has a space area and also if the frequency prediction value is greater than or equal to the reference value. If there is no space area, a flow with the smallest frequency prediction value is selected as the assembling termination flow from among the flows including the existing entries, and a new entry is added to the flow table. Also, if the flow has no entry and at the same time the frequency prediction value is smaller than the reference value, the flow is not registered in the flow table and is selected as the assembling termination flow. After selecting the assembling termination flow, the assembling controller sends the corresponding flow information to the DMA engine 17. The waiting time processor 16b is started at regular intervals by the timer 19 or the like. Each time the waiting time processor is started, it updates the timer information indicative of waiting times upon lapse of which the assembling of the respective flows recorded in the flow table is to be terminated. On expiry of a waiting time, the corresponding flow is notified as the assembling termination flow.

The DMA engine 17 corresponds to the packet transfer unit 1g. On acquiring the flow information from the flow processor 16 and a forwarding address from the host 3, the DMA engine transfers, in accordance with the flow information, the corresponding packet data stored in the packet queue 13 to an area of the buffer of the host 3 specified by the forwarding address.

Operation of the packet processing device of the embodiment will be now described.

When the packet processing device 10 is initialized by the start of power supply or the like, the data in the frequency prediction value database 11 and the flow table database 12 is initialized and "000" is set as the frequency prediction values of the individual flows stored in the frequency prediction value database 11.

When a packet is received via the network 2, the received packet is stored in the packet queue 13 and is also sent to the packet parser 14 for the extraction of analysis information. It is assumed here that the source and destination IP addresses, the source and destination port numbers and the next sequence number are extracted from the received packet as the analysis information. The analysis information is sent to the frequency predictor 15 and the flow processor 16.

On acquiring the analysis information, the frequency predictor 15 reads, from the frequency prediction value database 11, the frequency prediction value of the flow identified by the analysis information, then sends the read value to the flow processor 16, and also sets the frequency prediction value to the highest level "111" corresponding to the shortest packet reception interval. Then, using the short- and long-interval timers, the frequency predictor updates the frequency prediction values of the individual flows as time elapses.

Figure 6:
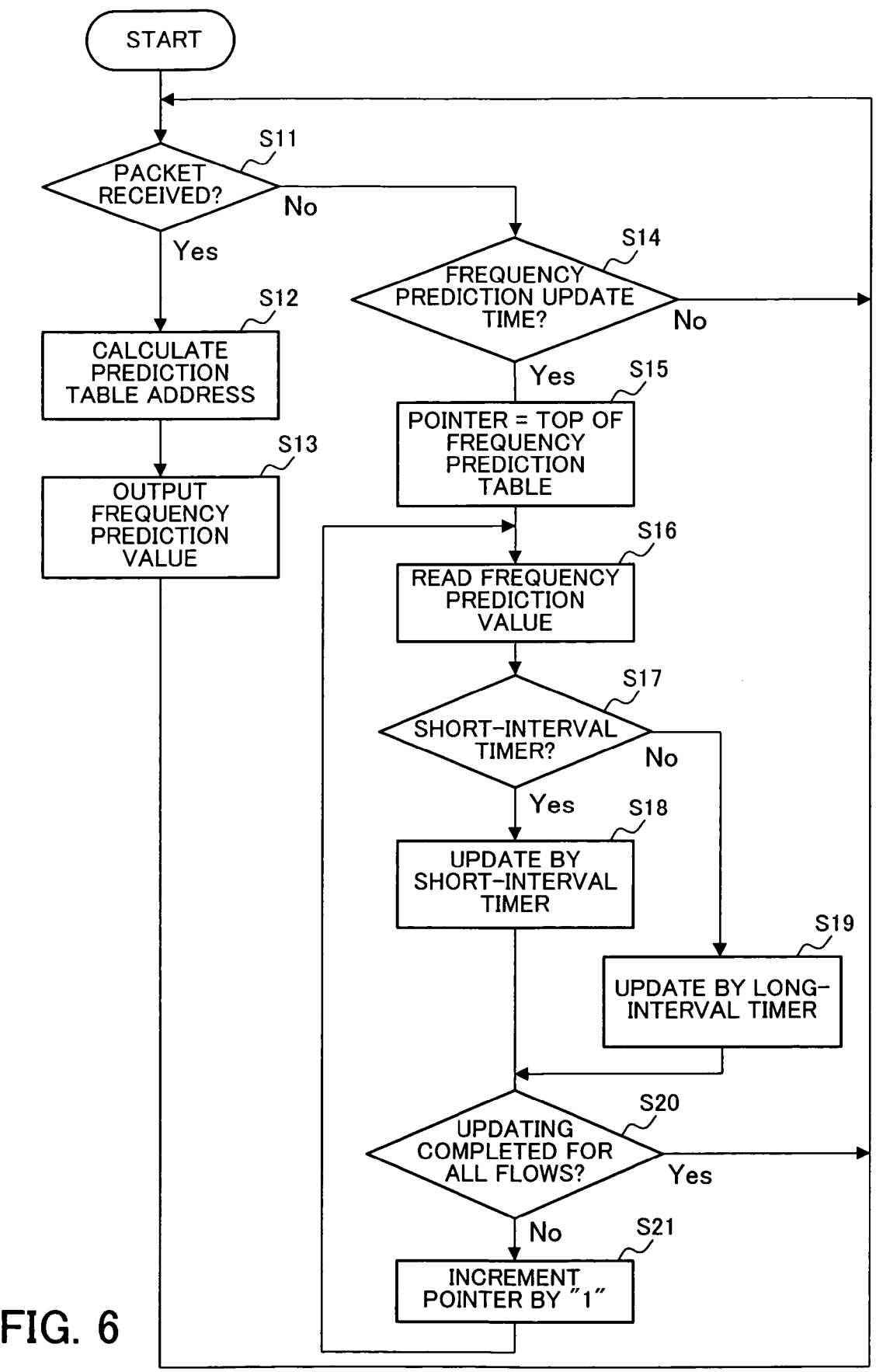
FIG. 6 is a flowchart illustrating a frequency prediction process according to the embodiment.

FIG. 6 is a flowchart illustrating the frequency prediction process according to the embodiment. The process shown in the flowchart of FIG. 6 is a process executed all the time and not a process started by an event such as the acquisition of the analysis information by the frequency predictor 15 or the expiry of the timer.

STEP S11: The frequency predictor 15 determines whether or not a packet has been received, that is, whether or not analysis information has been acquired from the packet parser 14. If analysis information has been acquired, Step S12 and the following step are executed by the frequency prediction reader 15a; if no analysis information has been acquired, Step S14 and the following steps are executed by the frequency prediction calculator 15b.

STEP S12: Since a packet has been received and the analysis information on the packet has been acquired, the frequency prediction reader 15a calculates, based on the analysis information, a frequency prediction table address of the frequency prediction value database 11 where the frequency prediction value of the corresponding flow is stored.

STEP S13: The frequency prediction value is read from the calculated frequency prediction table address and is output to the flow processor 16. Subsequently, the frequency prediction value stored at that address is updated to "111", which is the frequency prediction value set after packet reception. The process then returns to Step S11 and is repeatedly executed.

STEP S14: Since a packet is not received yet, the frequency prediction calculator 15b determines whether or not a frequency prediction update time has expired. If the frequency prediction update time has not yet expired, the process returns to Step S11 and is repeatedly executed.

STEP S15: A packet is not received yet but the frequency prediction update time has expired; in this case, a frequency prediction value readout pointer is set at the top of a frequency prediction table.

STEP S16: A frequency prediction value is read from the pointer-specified area of the frequency prediction table.

STEP S17: Based on the read frequency prediction value, it is determined whether the timer to be used is the short-interval timer or not. In the example of FIG. 4, the long-interval timer is used if the frequency prediction value is "100" or less; otherwise the short-interval timer is used. If the decision is that the long-interval timer should be used, the process proceeds to Step S19.

STEP S18: Since the short-interval timer has been selected in accordance with the read frequency prediction value, an updating process by means of the short-interval timer is carried out. Specifically, if a frequency prediction update time measured by the short-interval timer has expired, the frequency prediction value is updated to a lower-level value, and if the frequency prediction update time has not expired yet, no updating is performed. The process then proceeds to Step S20.

STEP S19: Since the long-interval timer has been selected in accordance with the read frequency prediction value, an updating process by means of the long-interval timer is performed. Specifically, if the frequency prediction update time measured by the long-interval timer has expired, the frequency prediction value is updated to a lower-level value, and if the frequency prediction update time has not expired yet, no updating is carried out. In the case where the frequency prediction value is "000", the value is left unchanged.

STEP S20: It is determined whether or not updating of the frequency prediction value has been completed for all flows. If the updating has been completed for all flows, the process returns to Step S11 and is repeatedly executed.

STEP S21: Since the updating of the frequency prediction value is not completed for all flows, the pointer is incremented by "1", whereupon the process returns to Step S16 to update the frequency prediction value of the next flow.

As the aforementioned process is performed, the frequency prediction values are set, and when a packet is received, the corresponding frequency prediction value is read out and output to the flow processor 16.

Figure 7:
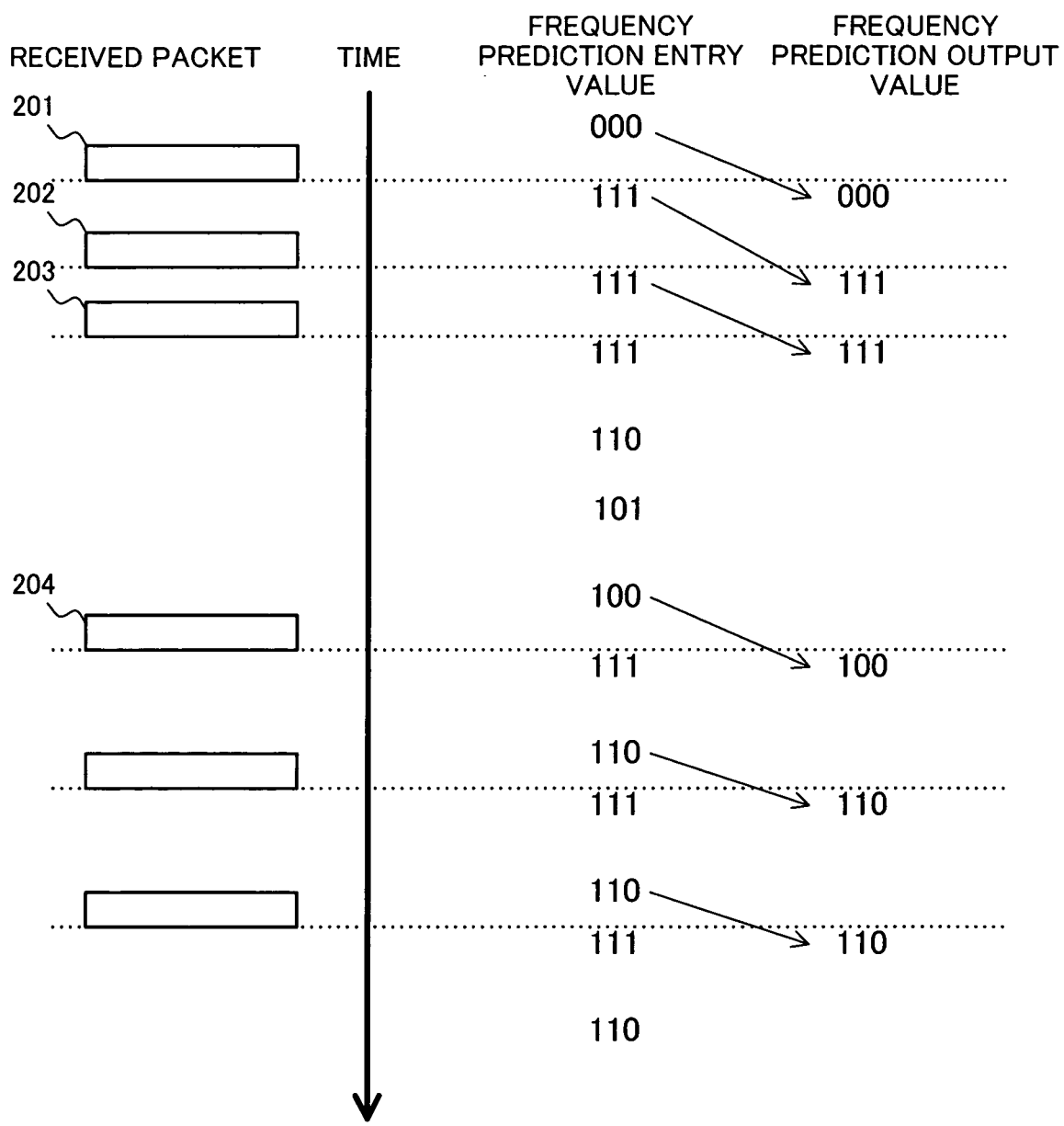
FIG. 7 illustrates the relationship between change of the frequency prediction value and a read frequency prediction value according to the embodiment.

FIG. 7 illustrates the relationship between change of the frequency prediction value and the read frequency prediction value according to the embodiment. More specifically, the figure shows the relationship among received packets, the frequency prediction values stored in the frequency prediction value database 11 (hereinafter referred to as frequency prediction entry values), and the read frequency prediction values output to the flow processor 16 (hereinafter referred to as frequency prediction output values).

The value "000" set due to initialization as the frequency prediction entry value remains the same until a packet is received. When a packet 201 is received, the frequency prediction reader 15a reads out the frequency prediction entry value "000" and outputs the read value as the frequency prediction output value. Then, the frequency prediction reader updates the frequency prediction entry value to "111".

If a packet 202 is received before the initial frequency prediction update time expires, the frequency prediction reader 15a reads out the frequency prediction entry value "111" and outputs the read value as the frequency prediction output value. Then, "111" is set as the frequency prediction entry value.

If, after a packet 203 is received, a succeeding packet does not arrive for a while, the frequency prediction entry value is successively updated by the frequency prediction calculator 15b with every passage of the frequency prediction update time. In the illustrated example, each time the frequency prediction update time expires, "1" is subtracted from the frequency prediction entry value, so that "111" changes finally to "100". During this period of time, no frequency prediction output value is provided, and accordingly, the frequency prediction value set in the flow information remains at "111".

When a packet 204 is received, the frequency prediction reader 15a reads out the frequency prediction entry value "100" and outputs the read value as the frequency prediction output value. Then, the frequency prediction reader sets "111" as the frequency prediction entry value.

In this manner, the frequency predictor 15 sets the frequency prediction value based on the time elapsed from the reception of a preceding packet to the reception of a current packet and sends the frequency prediction value to the flow processor 16.

The flow to which a packet belongs is identified by the combination of source and destination IP addresses and source and destination port numbers, as stated above. In the case of TCP/IP, however, the number of such combinations is enormous and it is not practical to prepare a storage area capable of storing all combinations. The following describes a method of calculating an address of the frequency prediction table with an adequate storage area where the frequency prediction value is stored.

Figure 8:
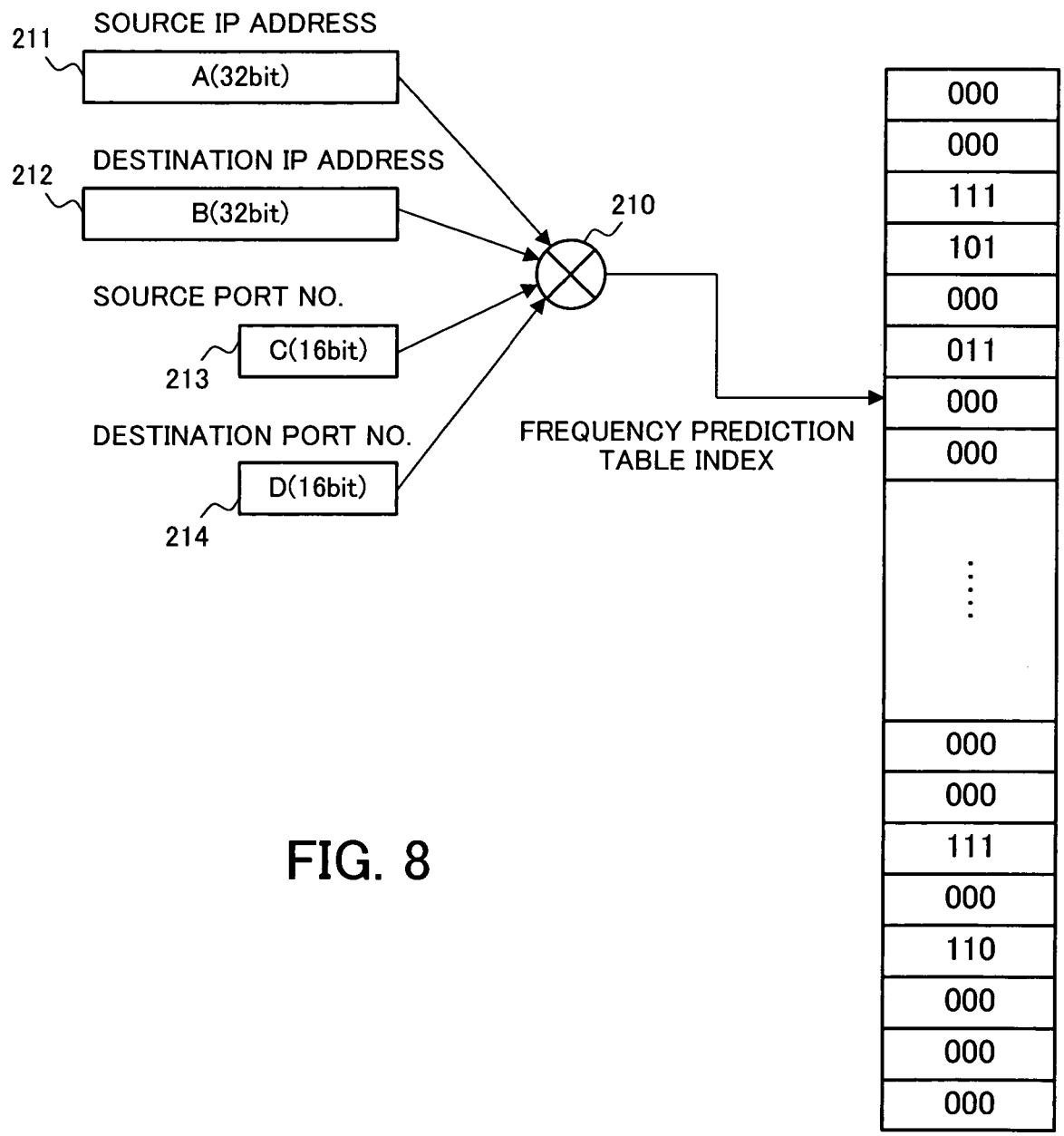
FIG. 8 illustrates a procedure for calculating a frequency prediction table address according to the embodiment.

FIG. 8 illustrates the procedure for calculating an address of the frequency prediction table according to the embodiment.

In the illustrated example, a 32-bit source IP address A (211), a 32-bit destination IP address B (212), a 16-bit source port number C (213) and a 16-bit destination port number D (214) are operated by an index operator 210 to create a 16-bit frequency prediction table index. For example, the index operator 210 derives exclusive-OR's (XOR's) of all input data to generate the index. Other hash functions may also be used. Methods of creating an index by using such functions are known in the art, and therefore, detailed description thereof is omitted.

In the above description, the short- or long-interval timer is used to update the frequency prediction value successively with every passage of the frequency prediction update time. Alternatively, the acquisition time of a previously received packet may be stored in the frequency prediction table so that the frequency prediction value may be set based on the difference between the acquisition time of the previously received packet and that of a currently received packet.

Figure 9:
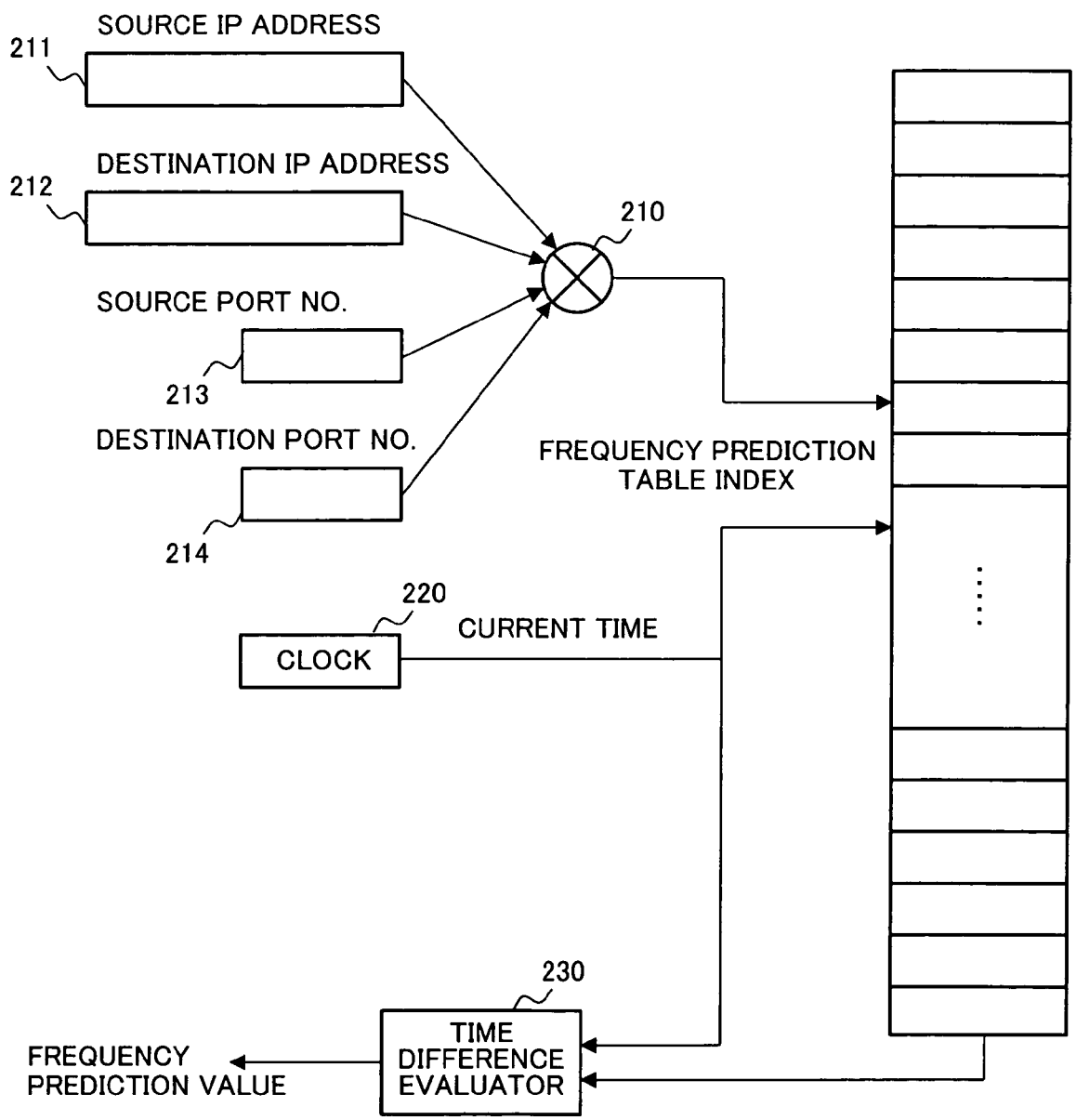
FIG. 9 illustrates another procedure for calculating the frequency prediction value.

FIG. 9 illustrates another frequency prediction value calculation process according to the embodiment. The frequency prediction table index is calculated in the same manner as explained with reference to FIG. 8, and therefore, description thereof is omitted.

In this frequency prediction value calculation process, a clock 220 capable of acquiring a current time and a time difference evaluator 230 for calculating a frequency prediction value based on the packet reception interval are used in addition to the elements shown in FIG. 8.

First, on acquisition of a received packet, the index operator 210 calculates an index of the frequency prediction table on the basis of the analysis information. A current time acquired from the clock 220 is stored in an area specified by the index. When a packet belonging to the same flow is received thereafter, the index operator 210 derives the index specifying the same area. The time difference evaluator 230 compares the time information (reception time of the preceding packet) stored in the frequency prediction table with the current time (reception time of the current packet) indicated by the clock 220, and sets the frequency prediction value based on the time difference. The smaller the time difference, the larger value is set as the frequency prediction value. Thus, also with this calculation method, it is possible to calculate frequency prediction values based on the reception intervals of respective flows. The current time is used to obtain the time difference, and accordingly, a counter or the like may be used for the purpose.

As a result of the aforementioned process by the frequency predictor 15, the flow processor 16 is supplied with the frequency prediction value calculated with respect to the flow to which the received packet belongs. The following describes the assembling process performed by the flow processor 16.

First, the flow table for storing the flow information associated with individual flows will be explained. FIG. 10 shows an exemplary flow table according to the embodiment.

The flow table holds flow identification (ID) information 310 obtained from the analysis information and identifying individual flows, and assembling management information 320 for managing the assembling process.

In the illustrated example, the source IP address, source and destination port numbers and next sequence number acquired from the analysis information are set as the flow identification information 310. The flow to which a received packet belongs is identified by collating the source IP address and source and destination port numbers included in the analysis information on the received packet with the corresponding data in the flow identification information 310 of the flow table. If a matching entry is found, the received packet is regarded as belonging to the flow corresponding to the entry; if there is no matching entry, the received packet is regarded as belonging to a new flow.

As the assembling management information 320, a timer/counter 321 for measuring the assembling termination waiting time and a frequency prediction value 322 calculated by the frequency predictor 15 are set with respect to each flow. When a packet is received, the frequency prediction value of the flow to which the packet belongs is set for the corresponding frequency prediction value 322. For the timer/counter 321 is set the count of a timer which is reset to "0" on reception of a packet and which is incremented by "1" at regular intervals.

In this embodiment, the entries are replaced in accordance with the frequency prediction values, and accordingly, the number of entries provided in the flow table may be equal to the number of parallel assembling processes to be performed. Thus, compared with conventional flow tables, the required memory area can be cut down.

The flow table shown in FIG. 10 is given by way of example only and may include other information as the flow identification information or the assembling management information.

Figure 11:
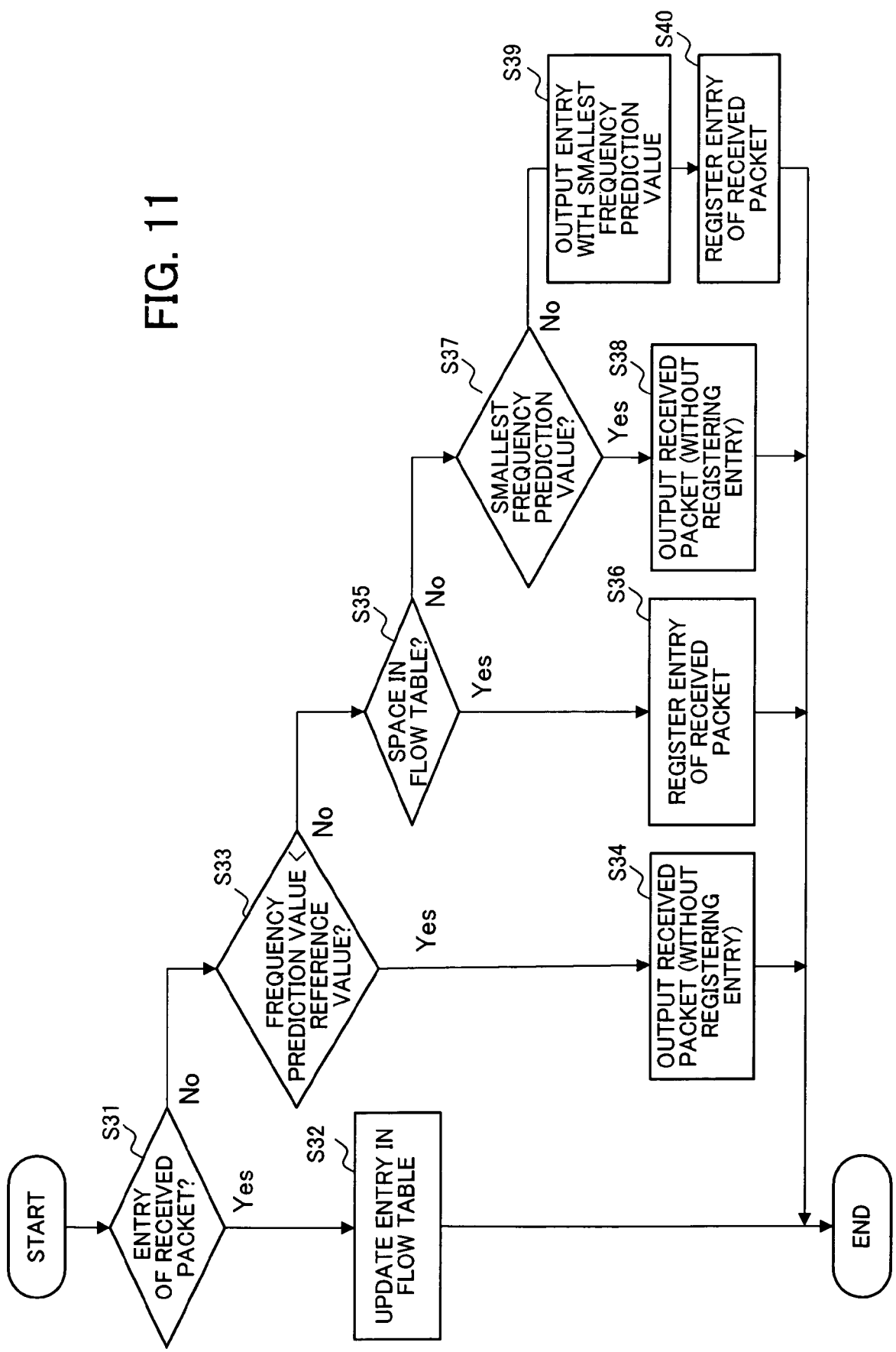
FIG. 11 is a flowchart illustrating an assembling process according to the embodiment.

The assembling process using the flow table will be now described. FIG. 11 is a flowchart illustrating the assembling process according to the embodiment.

The flow processor starts the process on acquiring the analysis information on a received packet from the packet parser 14 and the frequency prediction value of the corresponding packet flow from the frequency predictor 15.

STEP S31: Based on the analysis information, the flow table database 12 is searched to determine whether or not there is an entry of the flow information on the flow to which the received packet belongs. If there is no such entry, the process proceeds to Step S33.

STEP S32: The flow to which the received packet belongs has an entry in the flow table; in this case, the frequency prediction value in the entry is updated to the value acquired from the frequency predictor 15 and also the timer/counter is reset to "0", thus allowing the packet assembling of the corresponding flow to continue. Subsequently, the process ends.

STEP S33: In the case where the flow of the received packet has no entry in the flow table and thus is a new entry, the frequency prediction value of the new entry is compared with the reference value, to determine whether or not the former is greater than the latter. If the frequency prediction value is greater than or equal to the reference value, the process proceeds to Step S35.

STEP S34: The frequency prediction value of the new entry is smaller than the reference value; in this case, the assembling is not performed and the DMA engine 17 is instructed to transfer the received packet to the host 3. Accordingly, the packet is transferred to the host 3 without being delayed by the assembling. In this case, the flow information on the received packet is not registered as an entry. Subsequently, the process ends.

STEP S35: In the case where the frequency prediction value of the new entry is greater than or equal to the reference value, the flow table is checked to determine whether or not there is a space area for adding the new entry. If there is no such space area, the process proceeds to Step S37.

STEP S36: The flow to which the received packet belongs is a new entry and also the flow table has a space area; in this case, the new entry corresponding to this flow is registered in the space area of the flow table, whereupon the process ends. Consequently, the assembling is started for the new entry.

STEP S37: The flow to which the received packet belongs is a new entry and also the flow table has no space area; in this case, the frequency prediction value of the flow of the received packet is compared with those of the other entries stored in the flow table. If there is an entry of which the frequency prediction value is smaller than that of the new entry, the process proceeds to Step S39.

STEP S38: The flow to which the received packet belongs is a new entry, the flow table has no space area, and the frequency prediction value of the new entry is the smallest. In this case, the DMA engine 17 is instructed to transfer the received packet to the host 3, as in Step S34, and the flow information on the received packet is not registered as an entry. Subsequently, the process ends.

STEP S39: In the case where the flow table has no space area and there is an entry whose frequency prediction value is smaller than that of the new entry, the flow corresponding to an entry with the smallest frequency prediction value is selected as the assembling termination flow to terminate the packet assembling. Consequently, the then-stored packets of the corresponding flow are transferred to the host 3 by the DMA engine 17.

STEP S40: The entry of the flow with respect to which the packet assembling was terminated in Step S39 is deleted and the new entry is added to the space area, whereupon the process ends. Accordingly, the packet assembling is started for the new entry.

As the aforementioned process is performed, packets are assembled according to the frequency prediction values in the manner described below.

With respect to flows having smaller frequency prediction values than the reference value, packets are not assembled but are directly transferred to the host 3. Also, the received packet of a flow which is not the target of assembling may be similarly transferred without delay. Whether to transfer packets directly or not may be determined by the flow processor 16 in accordance with the analysis information or by the frequency predictor 15 or the packet parser 14. For example, a rule may be set such that if the frequency prediction value supplied from the frequency predictor 15 is "000" the assembling is not performed, and a determination may be made in Step S33 as to whether or not the frequency prediction value is "000". Thus, the packet of a flow which is not the target of assembling can be transferred directly to the host 3 without being delayed by the assembling.

If the frequency prediction value of a flow is greater than the reference value, the corresponding packets are assembled. In this case, the entries of the flow table are replaced in accordance with the frequency prediction values of the respective flows.

However, in cases where the flow table has a space area or the flow already has an entry, the replacement of entries is not carried out. Where the flow table has a space area, a new flow is added as a new entry, and where the flow already has an entry, the corresponding frequency prediction value is updated to the latest value.

If the flow is a new entry but the flow table has no space area, the frequency prediction value of the new entry and those of the entries stored in the flow table are compared with one another to identify an entry with the smallest frequency prediction value, and the packet assembling of the corresponding flow is terminated. The flow with the smallest frequency prediction value is a flow of which the succeeding packet is expected to arrive after a long lapse of time and with respect to which the packet assembling cannot be effectively performed and should preferably be excluded also in view of efficient use of the flow table. In the case where an entry other than the new entry is selected as the assembling termination flow, the selected entry is deleted to make a space area and the new entry is added to this area.

Thus, in this embodiment, flows with greater frequency prediction values, with respect to which the packet assembling can be effectively performed, are preferentially entered to assemble corresponding packets, whereby the packet assembling can be efficiently carried out.

Referring now to a specific example, the replacement of entries will be explained.

FIG. 12 exemplifies a state of the flow table before the replacement of entries during the assembling process according to the embodiment. It is assumed that the flow table is capable of registering a maximum of four entries, for simplicity of illustration.

In the illustrated example, the flow table stores entries 301, 302, 303 and 304 of flows each identified by the source IP address, the source port number and the destination port number. Also, with respect to the entries 301, 302, 303 and 304, the frequency prediction values "110", "100", "010" and "111" are set, respectively.

Let us suppose that a new entry is input.

Figure 13:
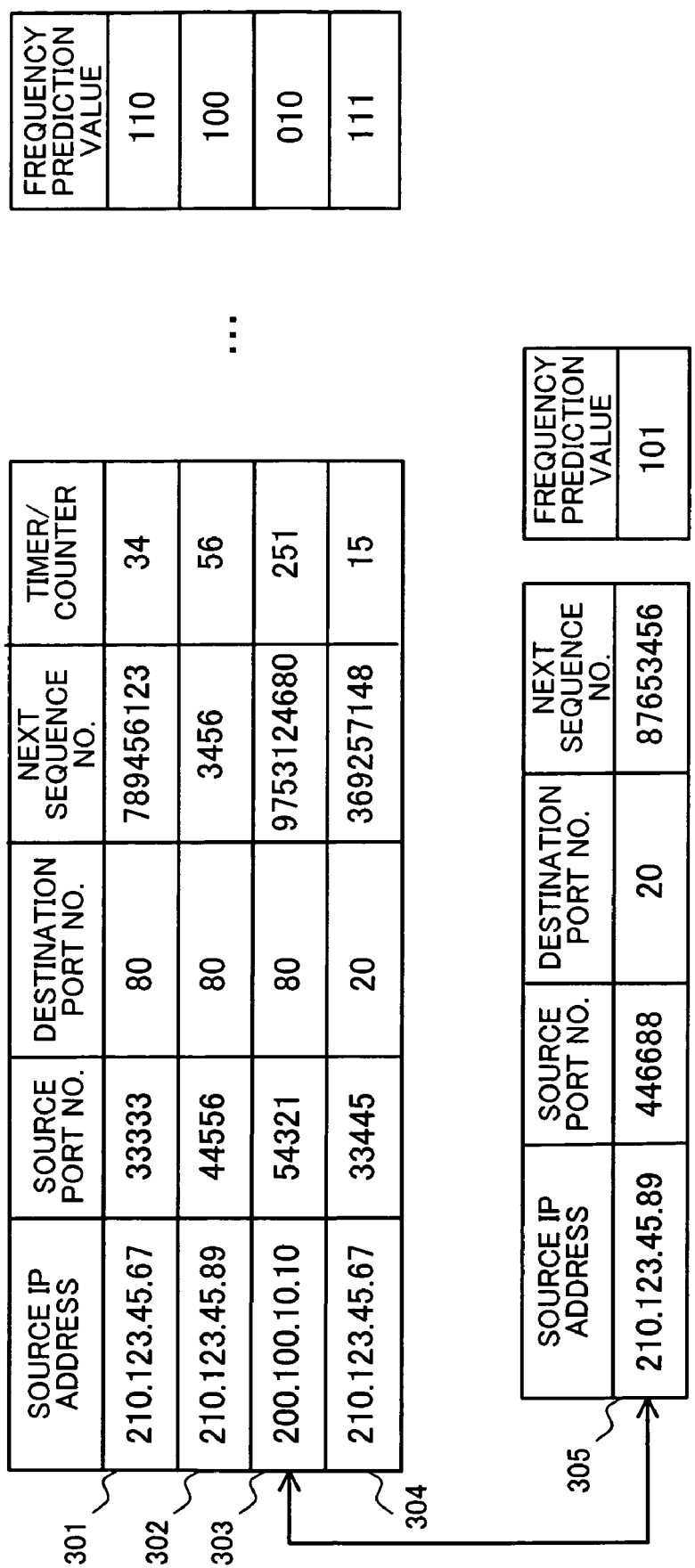
FIG. 13 shows an exemplary state of the flow table wherein a new entry is generated during the assembling process according to the embodiment.
Figure 15:
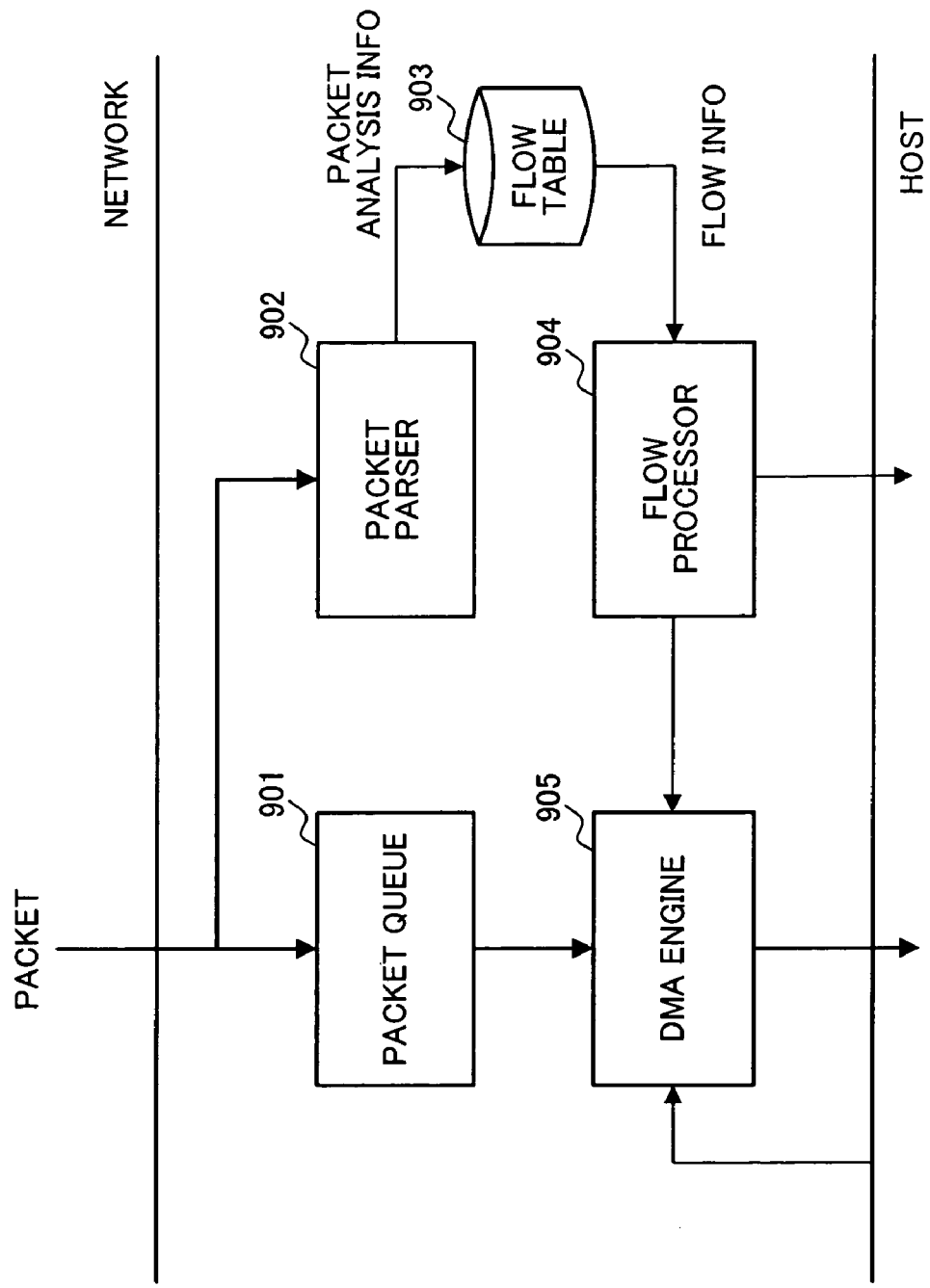
FIG. 15 shows the configuration of a conventional packet processing device.

FIG. 13 exemplifies a state of the flow table wherein a new entry is generated during the assembling process according to the embodiment.

In the illustrated example, a new entry 305 has been generated while the flow table is in the state shown in FIG. 12. The flow processor 16 compares the frequency prediction value "101" of the new entry 305 with each of the frequency prediction values of the entries 301 to 304, to locate an entry with the smallest frequency prediction value. In the illustrated example, the frequency prediction value "010" of the entry 303 is the smallest and thus the packet assembling of the entry 303 should be terminated, so that the corresponding flow information is output to the DMA engine 17. Consequently, the packets stored until then with respect to the flow corresponding to the entry 303 are transferred to the host 3, and the entry 303 is deleted from the flow table.

FIG. 14 exemplifies a state of the flow table after the replacement of entries during the assembling process according to the embodiment.

In the illustrated example, the entry 303 has been deleted from the flow table shown in FIG. 13, with the entry 305 added to the position corresponding to the deleted entry.

As stated above, the flow table stores entries with frequency prediction values which are then the greatest.

Timer/counter is not explained with reference to the above process. Also in this embodiment, the assembling termination waiting time is measured by a timer/counter, and when the waiting time has expired, the packet assembling of the corresponding flow is terminated, as in conventional devices. Further, in this embodiment, the assembling termination waiting time is set in accordance with the frequency prediction value. Specifically, a shorter waiting time is set for a larger frequency prediction value and a longer waiting time is set for a smaller frequency prediction value, to transfer accumulated packets to the host 3.

In FIG. 12, for example, the counts of the timer/counters associated with the respective entries are incremented at regular intervals. For the frequency prediction values exceeding "100", the count "50" is set as the waiting time, and for the other frequency prediction values, the count "255" is set as the waiting time. In the illustrated-example, the packet assembling of the entries 301 and 304 is terminated when the count of their timer/counter reaches "50". On the other hand, the packet assembling of the entries 302 and 303 is not terminated until the count of their timer/counter reaches "255".

By varying the waiting time in accordance with the frequency prediction value, it is possible to set a short waiting time for a flow which has a large frequency prediction value and thus of which the succeeding packet arrives in a short time. As a result, delay attributable to the assembling process can be lessened.

The processing function described above can be performed by a computer. In this case, a program is prepared in which is described the process for performing the function of the packet processing device. The program is executed by a computer, whereupon the aforementioned processing function is accomplished by the computer. The program describing the process may be recorded on computer-readable recording media. As such computer-readable recording media, magnetic recording devices, optical discs, magneto-optical recording media, semiconductor memories, etc. may be used. Magnetic recording devices include a hard disk drive (HDD), a flexible disk (FD), a magnetic tape, etc. Optical discs include a DVD (Digital Versatile Disc), a DVD-RAM, a CD-ROM (Compact Disc Read Only Memory), a CD-R (Recordable)/RW (ReWritable), etc. Magneto-optical recording media include an MO (Magneto-Optical disk) etc.

A computer which is to execute the program stores in its storage device the program recorded on a portable recording medium or transferred from a server computer, for example. Then, the computer loads the program from its storage device and performs the process in accordance with the program. The computer may load the program directly from the portable recording medium to perform the process in accordance with the program. Also, as the program is transferred from the server computer, the computer may sequentially execute the process in accordance with the received program.

According to the present invention, the frequency prediction value is calculated for individual flows on the basis of their respective packet reception intervals, and a flow of which the packet assembling is to be terminated is selected based on the calculated frequency prediction values, to adjust the packet assembling timings in accordance with the frequency prediction values. Accordingly, the packet assembling of a flow with a small frequency prediction value, that is, the packet assembling of a flow of which the succeeding packet arrives after a long lapse of time, is terminated without waiting for the arrival of the succeeding packet to secure a storage area for flow information (space area in the flow table) so that flows with large frequency prediction values, with respect to which the packet assembling can be effectively performed, may be preferentially processed. It is therefore possible to effectively assemble packets while efficiently using resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet processing device for receiving a plurality of flows of packets arriving in random order and assembling the packets according to the flows, comprising:
   packet accumulator means for storing the received packets;
   packet analyzer means for analyzing the received packets and extracting analysis information about the flows to which the respective packets belong;
   frequency predictor means for measuring a reception interval of packets belonging to an identical one of the flows, calculating a reception frequency prediction value based on the measured reception interval, and storing the calculated frequency prediction value in frequency prediction storage means, the frequency predictor means being operative in response to input of the analysis information to read, from the frequency prediction storage means, the frequency prediction value of the flow corresponding to the input analysis information;
   flow processor means for generating flow information including the read frequency prediction value of the flow corresponding to the analysis information, selecting an assembling termination flow indicative of a flow of which packet assembling is to be terminated, based on the frequency prediction value of the generated flow information as well as those set in flow information stored in flow information storage means, and updating the flow information stored in the flow information storage means; and
   packet transfer means, responsive to selection of the assembling termination flow by the flow processor means, for outputting the packets stored in the packet accumulator means and associated with the selected assembling termination flow to a transfer destination,
   wherein level values indicative of frequency levels corresponding to respective different ranges of the reception interval are defined beforehand, and
   wherein when a packet is received, the frequency predictor means sets a level value indicative of highest reception frequency as the frequency prediction value and sets the level value successively to a lower level value with every passage of a predetermined frequency prediction update time.

2. The packet processing device according to claim 1, wherein, if the frequency prediction value of the flow corresponding to the analysis information and included in the generated flow information is smaller than a frequency reference value below which the packet assembling is not performed, the flow processor means selects the flow as the assembling termination flow.

3. The packet processing device according to claim 1, wherein the flow processor means sets, in the flow information, timer information about awaiting time indicative of a time at which the packet assembling is to be terminated, and selects the corresponding flow as the assembling termination flow upon detection of expiry of the waiting time.

4. The packet processing device according to claim 3, wherein the flow processor means sets the waiting time in the timer information in accordance with the frequency prediction value of the corresponding flow.

5. The packet processing device according to claim 4, wherein the flow processor means compares the frequency prediction value with a predetermined reference value and, if the frequency prediction value is greater than the predetermined reference value, sets the waiting time to a shorter waiting time shorter than the waiting time applied when the frequency prediction value is smaller than the predetermined reference value.

6. The packet processing device according to claim 1, wherein, if the flow information storage means does not have an area for storing new flow information, the flow processor means selects, based on the new flow information and the flow information stored in the flow information storage means, a flow with a smallest frequency prediction value as the assembling termination flow, and stores the remaining flow information, except the flow information corresponding to the assembling termination flow, in the flow information storage means.

7. The packet processing device according to claim 1, wherein, if the flow information on the flow corresponding to the analysis information is already stored in the flow information storage means, the flow processor means updates the frequency prediction value of the flow information stored in the flow information storage means to the value acquired from the frequency predictor means.

8. The packet processing device according to claim 1, wherein, when reception of a predetermined packet which is not a target of the packet assembling is detected, the flow processor means instructs the packet transfer means to transfer the predetermined packet.

9. The packet processing device according to claim 1, wherein the flow information storage means has a storage area for storing a plurality of items off low information corresponding to the number of flows that can be processed in parallel.

10. The packet processing device according to claim 1, wherein the frequency predictor means sets the frequency prediction update time variably in accordance with a time elapsed from the reception of the packet.

11. The packet processing device according to claim 1, wherein, after a predetermined time elapses from the reception of the packet, the frequency predictor means sets the frequency prediction update time to a longer time longer than the frequency prediction update time applied before the predetermined time elapses.

12. The packet processing device according to claim 1, wherein the frequency predictor means stores, in the frequency prediction storage means, a each time a predetermined time elapses, sets the corresponding frequency prediction value in accordance with an elapsed time obtained from a difference between the latest packet reception time and a current time.

13. A computer-readable recording medium recording a packet processing program for receiving a plurality of flows of packets arriving in random order and assembling the packets according to the flows,
   wherein the packet processing program causes a computer to function as:
   a packet analyzer to analyze the received packets and extract analysis information about the flows to which the respective packets belong;
   a frequency predictor to measure a reception interval of packets belonging to an identical one of the flows, calculate a reception frequency prediction value based on the measured reception interval, and store the calculated frequency prediction value in a frequency prediction memory, the frequency predictor being operative in response to input of the analysis information to read, from the frequency prediction memory, the frequency prediction value of the flow corresponding to the input analysis information;
   a flow processor to generate flow information including the read frequency prediction value of the flow corresponding to the analysis information, select an assembling termination flow indicative of a flow of which packet assembling is to be terminated, based on the frequency prediction value of the generated flow information as well as those set in flow information stored in a flow information memory, and update the flow information stored in the flow information memory; and a packet transfer unit, responsive to selection of the assembling termination flow by the flow processor, to output the packets stored in a packet accumulator and associated with the selected assembling termination flow to a transfer destination, wherein level values indicative of frequency levels corresponding to respective different ranges of the reception interval are defined beforehand, and wherein when a packet is received, the frequency predictor sets a level value indicative of highest reception frequency as the frequency prediction value and sets the level value successively to a lower level value with every passage of a predetermined frequency prediction update time.

* * * * *